O. A. WAGNER.
REAR SPRING FRAME FOR MOTOR CYCLES.
APPLICATION FILED JUNE 26, 1915.
1,171,371.
Patented Feb. 8, 1916.
2 SHEETS—SHEET 1.
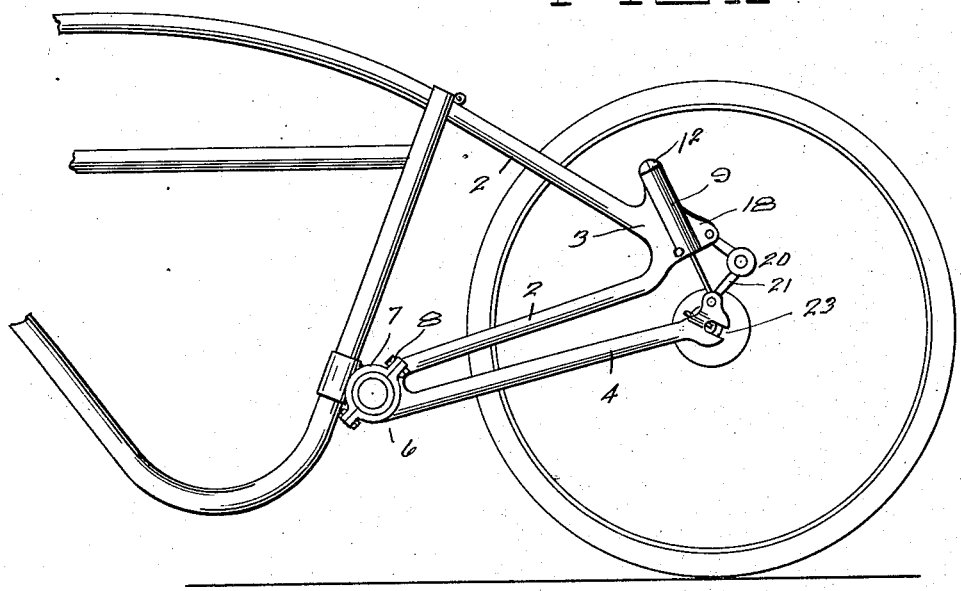
FIG. 1
FIG. 3
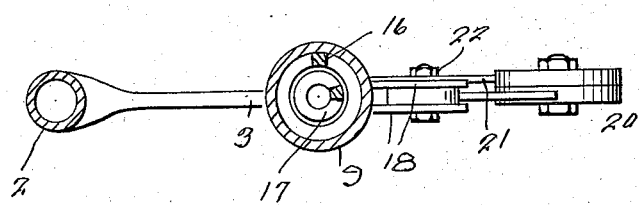
Inventor
O. A. Wagner

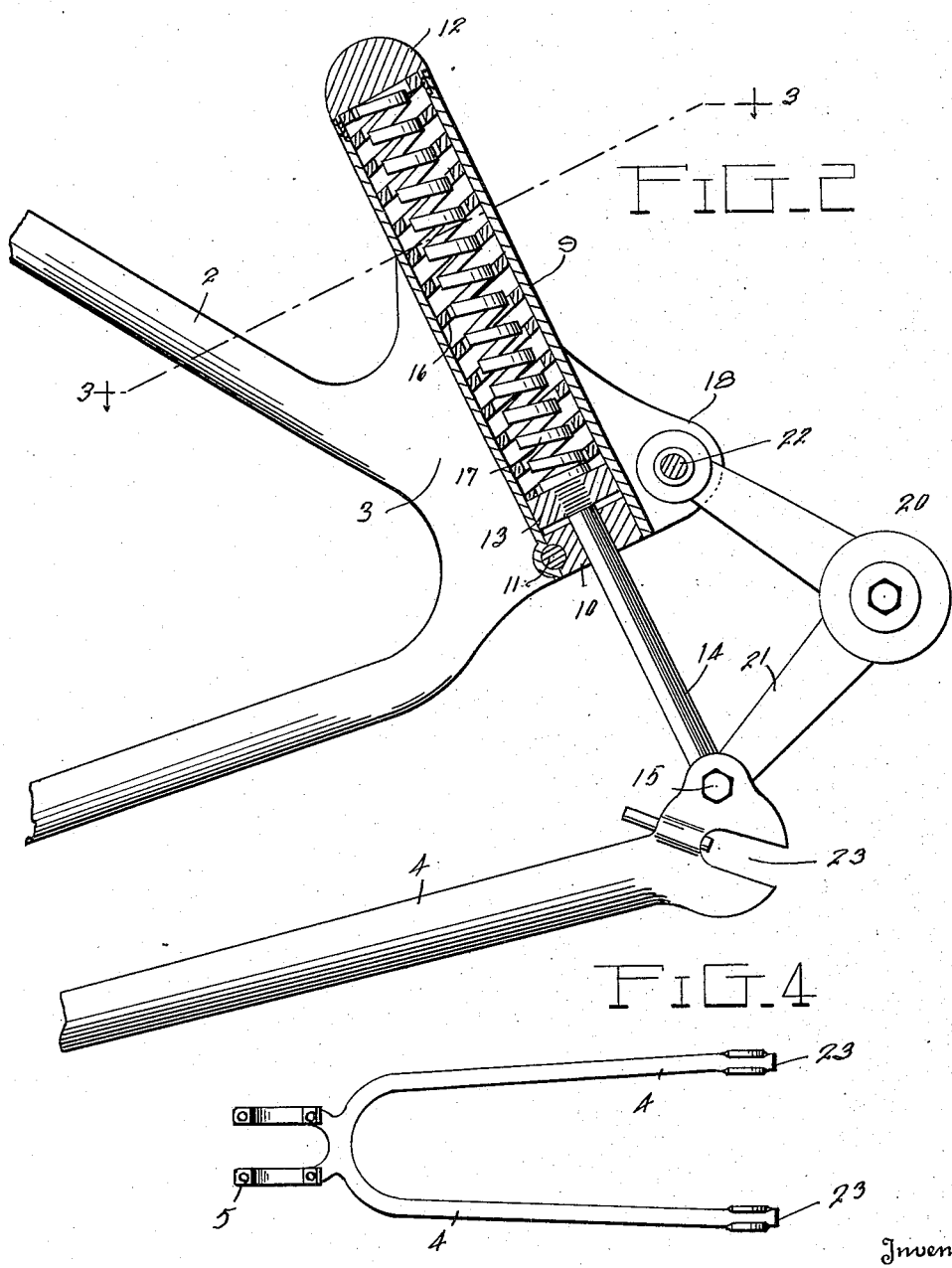

UNITED STATES PATENT OFFICE.

OTTO A. WAGNER, OF ENSIGN, KANSAS.

REAR SPRING-FRAME FOR MOTOR-CYCLES.

1,171,371. Specification of Letters Patent. Patented Feb. 8, 1916.

Application filed June 26, 1915. Serial No. 36,439.

*To all whom it may concern:*

Be it known that I, OTTO A. WAGNER, a citizen of the United States, residing at Ensign, in the county of Gray and State of Kansas, have invented certain new and useful Improvements in Rear Spring-Frames for Motor-Cycles; and I do hereby declare the following to be a full, clear, and exact description of the invention, such as will enable others skilled in the art to which it appertains to make and use the same.

This invention is an improved rear spring frame for a motorcycle, the object of the invention being to provide an improved device of this kind which secures maximum strength and rigidity, which is adjustable so that wear may be taken up in the main joint and which embodies a shock absorber which includes a main spring in a barrel and a smaller spring in the main spring which serves as a spring bumper to check severe road shocks, another object being to provide an improved device of this character which embodies also a shock absorber of the Trufalt type and which coacts with the first-named shock absorber and hence causes the motorcycle to ride easily and smoothly.

The invention consists in the construction, combination and arrangement of devices hereinafter described and claimed.

In the accompanying drawings: Figure 1 is an elevation of the rear portion of a motorcycle embodying a rear spring frame constructed in accordance with my invention. Fig. 2 is partly a detail elevation and partly a sectional view of the same. Fig. 3 is a transverse sectional view on the plane indicated by the line 3—3 of Fig. 2. Fig. 4 is a detail plan of the rear fork.

A portion of the frame of a motorcycle is indicated at 1, the rear stays at 2 and a bracket web 3, arranged in a vertical plane, is provided at the angle between the rear ends of the rear stays and projects rearwardly therefrom.

In accordance with my invention the rear fork or radial fork 4 is provided at its front end with a pair of spaced bearings 5 which engage the pedal shaft 6, each of said bearings having a removable semi-circular member 7 secured thereto by screws 8 to take the wear at the main joint. The rear stays fork in the usual manner and on the outer side of each of the webs 3 is a barrel, 9, arranged at a suitable inclination, provided with a lower head 10 which is secured in place by a bolt 11 and also provided with a cap or upper head 12 which is brazed to the upper end of the barrel.

A piston 13 operates in each barrel 9 and is connected by a rod 14 to the rear end of one arm of the rear fork 4 by means of a pivot bolt 15. A large coiled spring 16 is arranged in each barrel and bears between the upper head 12 and the piston. A smaller coiled spring 17 is arranged in each large spring and also bears between said head 12 and the piston. The barrels with their springs and pistons form shock absorbers which yieldingly connect the rear ends of the arms of the rear fork to the rear stays of the motorcycle frame, the smaller spring 17 serving as spring bumpers to check severe road shocks. Each barrel 9 is provided on its rear side at its lower end with a pair of rearwardly extending lugs 18. In connection with each barrel and each arm of the fork I also provide a friction shock absorber to catch the rebounds, such for instance as an absorber of the Trufalt type indicated at 20 one arm 21 of each Trufalt shock absorber being pivotally connected to the rear end of one of the rear fork arms by the pivot bolt 15 and the other arm of said shock absorber being pivoted between the lugs 18 of one of the barrels by a bolt 22. The usual bearings for the axle of the rear wheel are indicated at 23.

It will be observed that the front end of the rear fork is connected to the shell or part on the frame that usually contains the bearings for the pedal cranks, and that by the provision of a removable and adjustable bearing member 7 wear can be readily taken up. The lugs 18 on the shock absorber barrels 9 enable the Trufalt shock absorber to be employed between the solid frame and the rear axle, thus checking the road shock and also the recoil or rebound. The heads 10 in the lower ends of the barrels 9 are removable and held in place by the bolts 11 thus enabling the parts of the shock absorbers to be readily assembled and disassembled.

Having thus described my invention, I claim:—

1. A motorcycle frame having rear stays, in combination with a rear wheel fork pivotally connected to the frame, shock absorbers each comprising a barrel carried by the rear stays, a piston, a rod connecting the piston to one of the rear fork arms and a spring in the barrel and bearing on the piston and a friction shock absorber having one arm pivotally connected to an arm of the rear fork and the other arm pivotally connected to said barrel.

2. A motorcycle frame having rear stays, in combination with a rear wheel fork pivotally connected to the frame, shock absorbers each comprising a barrel carried by the rear stays, a piston, a rod connecting the piston to one of the rear fork arms and a spring in the barrel and bearing on the piston and a friction shock absorber having one arm pivotally connected to an arm of the rear fork and the other arm pivotally connected to said barrel, the barrels being provided with rearwardly extending lugs for the attachment of the last-named pivots and the first-named pivots being common to the other arms of the friction shock absorbers and to the piston rods.

In testimony whereof I affix my signature in presence of two witnesses.

OTTO A. WAGNER.

Witnesses:
E. E. SMITH,
A. DORSETT.

Copies of this patent may be obtained for five cents each, by addressing the "Commissioner of Patents, Washington, D. C."